(12) United States Patent
Grobbink et al.

(10) Patent No.: US 11,945,060 B2
(45) Date of Patent: Apr. 2, 2024

(54) METHOD OF FORMING TEETH OF A CUTTING BLADE OR GUARD

(71) Applicant: KONINKLIJKE PHILIPS N.V., Eindhoven (NL)

(72) Inventors: Steven Johan Grobbink, Makkum (NL); Mark Klaas Albert Veldhuis, Drachten (NL); Marcel Adriaansen, Roden (NL); Hendrik Christo Postmus, Drachten (NL); Nick Goet, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 325 days.

(21) Appl. No.: 17/606,602

(22) PCT Filed: May 8, 2020

(86) PCT No.: PCT/EP2020/062821
§ 371 (c)(1),
(2) Date: Oct. 26, 2021

(87) PCT Pub. No.: WO2020/225406
PCT Pub. Date: Nov. 12, 2020

(65) Prior Publication Data
US 2022/0297249 A1    Sep. 22, 2022

(30) Foreign Application Priority Data

May 8, 2019   (EP) ..................... 19173362

(51) Int. Cl.
*B23P 15/40*       (2006.01)
*B26B 19/38*       (2006.01)
(52) U.S. Cl.
CPC .......... *B23P 15/40* (2013.01); *B26B 19/3846* (2013.01); *B26B 19/3893* (2013.01)

(58) Field of Classification Search
CPC ... B23P 15/40; B26B 19/3846; B26B 19/3893
(Continued)

(56) References Cited

U.S. PATENT DOCUMENTS 3,741,046 A   6/1973   Chambon
4,037,322 A   7/1977   Bresler
(Continued)

FOREIGN PATENT DOCUMENTS

CN   104708039 A   6/2015
CN   105522596 A   4/2016
(Continued)

OTHER PUBLICATIONS

International Search Report and Written Opinion dated Jul. 1, 2020 for International Application No. PCT/EP2020/062821 Filed May 8, 2020.

*Primary Examiner* — Omar Flores Sanchez

(57) ABSTRACT

The present invention relates to a method (200) of forming a plurality of teeth of a cutting blade or guard, the method comprises: a) taking (210) a blank of material, the blank having an upper outer surface and a lower outer surface, wherein at least a portion of the lower outer surface is substantially planar and forms a plane of the blank; b) utilizing (220) a cutting device (20) In comprising a first die (40) and a second die (50), wherein the first die comprises a plurality of first elements (42) and the second die comprises a plurality of second elements (52), wherein a first plane (60) is defined with respect to upper surfaces of the plurality of first elements and a second plane (70) is defined with respect to lower surfaces of the plurality of second elements, and wherein each upper surface of the plurality of first elements has a centre part (44) that lies in the first plane and edge parts (46) that are below the first plane; c) placing (230) the blank in the cutting device, such that the portion of the lower outer surface faces the upper surfaces of the (Continued)

plurality of first elements and the portion of the upper outer surface faces the lower surfaces of the plurality of second elements; d) moving (240) the first die and second die with respect to each other such that the first plane is moved toward and passes through the second plane, such that each element of the plurality of first elements passes at least partially between adjacent elements of the plurality of second elements, and wherein teeth (80) of the cutting blade or guard are formed that correspond to the positions of the plurality of first elements and wherein the teeth have a lower outer surface formed from the lower outer surface of the blank; and e) utilizing (250) a bending device (30) to bend edge portions (82) of the teeth of the cutting blade or guard that extend below the plane of the blank after step d) back toward the plane of the blank.

14 Claims, 5 Drawing Sheets

(58) Field of Classification Search
USPC .................. 76/107.1, 106.5; 83/686, 684
See application file for complete search history.

(56) References Cited

U.S. PATENT DOCUMENTS

| | | | | |
|---|---|---|---|---|
| 4,921,154 A | * | 5/1990 | Abe | B26F 1/40 225/97 |
| 5,081,861 A | * | 1/1992 | Miura | B29C 70/887 72/462 |
| 5,088,195 A | * | 2/1992 | Lazarshik | B23P 15/40 30/346.55 |
| 5,458,717 A | * | 10/1995 | Kurita | B21D 28/16 29/17.2 |
| 5,600,890 A | * | 2/1997 | Leitner | B26B 19/06 72/340 |
| 5,802,721 A | | 9/1998 | Wain | |
| 5,957,024 A | * | 9/1999 | Kuwabara | B26F 1/02 83/687 |
| 7,008,684 B2 | * | 3/2006 | Haataja | B29C 43/40 83/660 |
| 7,430,951 B1 | * | 10/2008 | Li | B23D 15/08 83/684 |
| 8,166,854 B2 | * | 5/2012 | Fujimura | B21D 28/16 83/13 |
| 8,695,205 B2 | | 4/2014 | Moyer | |
| 8,789,449 B1 | * | 7/2014 | Saito | B21D 45/003 83/684 |
| 2014/0069163 A1 | * | 3/2014 | Nojiri | B21J 1/06 72/342.2 |
| 2014/0311306 A1 | | 10/2014 | Sablatschan | |
| 2016/0101530 A1 | * | 4/2016 | Sablatschan | B26B 19/3846 30/223 |
| 2017/0144319 A1 | | 5/2017 | Sablatschan | |

FOREIGN PATENT DOCUMENTS

EP          1354674 A1    10/2003
WO     2014/191867 A1    12/2014

* cited by examiner

METHOD OF FORMING TEETH OF A CUTTING BLADE OR GUARD

CROSS REFERENCE TO RELATED APPLICATIONS

This application is the U.S. National Phase application under 35 U.S.C. § 371 of International Application No. PCT/EP2020/062821 filed May 8, 2020, which claims the benefit of European Patent Application Number 19173362.5 filed May 8, 2019. These applications are hereby incorporated by reference herein.

FIELD OF THE INVENTION

The present invention relates to a method of forming a plurality of teeth of a cutting blade or guard, and a cutting and bending system for the forming of a plurality of teeth of a cutting blade or guard.

BACKGROUND OF THE INVENTION

The performance of haircutting systems, such as trimmers and shavers, is dependent on the metal cutting edges that cut the hair. These cutting edges exist on the guard and/or the cutting blade. It is known that for superior hair cutting performance it is preferred that the cutting edges have an acute angle (which is an angle smaller than 90 degrees) and be sharp. Typically, a sharp cutting edge is a cutting edge with a small tip radius.

This preferred geometry cannot be made with conventional cold forming techniques. E.g., stamping would lead to a straight angle and forging would lead to a blunt cutting edge. Other manufacturing techniques would enable the making of the geometry; however, these techniques are more complex and therefore more costly.

Patent document EP 1 354 674 A1, for example, discloses a method for manufacturing a hair clipper blade includes providing a blank with a comb teeth shaped cutting edge portion, and forging the cutting edge portion to have an acute tip angle.

There is a need to address this issue.

SUMMARY OF THE INVENTION

It would be advantageous to have improved means of manufacturing the teeth of a guard and/or cutting blade of a shaver and/or trimmer. The object of the present invention is solved with the subject matter of the independent claims, wherein further embodiments are incorporated in the dependent claims. It should be noted that the following described aspects and examples of the invention apply also to the method of forming a plurality of teeth of a cutting blade or guard, the cutting blade or guard having a plurality of teeth formed by the method, and the cutting and bending system for the forming of a plurality of teeth of a cutting blade or guard.

In a first aspect, there is provided a method of forming a plurality of teeth of a cutting blade or guard, the method comprising:
 a) taking a blank of material, the blank having an upper outer surface and a lower outer surface, wherein at least a portion of the lower outer surface is substantially planar and forms a plane of the blank;
 b) utilizing a cutting device comprising a first die and a second die, wherein the first die comprises a plurality of first elements and the second die comprises a plurality of second elements, wherein a first plane is defined with respect to upper surfaces of the plurality of first elements and a second plane is defined with respect to lower surfaces of the plurality of second elements, and wherein each upper surface of the plurality of first elements has a centre part that lies in the first plane and edge parts that are below the first plane;
 c) placing the blank in the cutting device, such that the portion of the lower outer surface faces the upper surfaces of the plurality of first elements and the portion of the upper outer surface faces the lower surfaces of the plurality of second elements;
 d) moving the first die and second die with respect to each other such that the first plane is moved toward and passes through the second plane, such that each element of the plurality of first elements passes at least partially between adjacent elements of the plurality of second elements, and wherein teeth of the cutting blade or guard are formed that correspond to the positions of the plurality of first elements and wherein the teeth have a lower outer surface formed from the lower outer surface of the blank;
 e) utilizing a bending device to bend edge portions of the teeth of the cutting blade or guard that extend below the plane of the blank after step d) back toward the plane of the blank.

In other words, a cutting and bending process is used to form cutting elements of a cutter/guard for hair cutting. The stamping part of the process cuts teeth of a cutting blade or guard that intentionally have edge portions that protrude below a plane of the cutting blade or guard. Then a bending part of the process bends these edge portions back, substantially back into the lower plane of the teeth, and these edge portions form sharp and robust cutting edges of the teeth of the cutting blade or guard. A process is therefore provided to form such a cutting blade/guard, the teeth having these sharp cutting edges, and which is more environmentally friendly than other techniques such as etching. The cutting edge can have a wedge angle smaller than 90 degrees.

Thus, the method can be used to form a cutting blade (generally the moving part in a shaving/grooming device), as well as the guard element (the one that is contacting the skin and is covering the cutter for example). The teeth being formed for a cutting blade and guard can apply to all forms of shaving and trimming elements, for example linear or rotary systems such as rota-shavers.

In an example, in step e) the bending device comprises a first plate comprising a substantially planar upper surface; and wherein the method comprises step f) bending the edge portions of the teeth of the cutting blade or guard by pushing the planar upper surface of the first plate against the lower outer surface of the teeth.

Thus, a substantially planar upper surface of the plate can push up against a part of a cut blank, that could be flat or be curved but be substantially flat over a region where teeth have been cut, and the plate in pushing up against this part of the blank bends the cut edges of the teeth in order to form sharp cutting edges of the teeth.

In an example, the first die and second die of the cutting device are configured such that in step d) when each element of the plurality of first elements passes at least partially between adjacent elements of the plurality of second elements, an element of the plurality first elements is laterally spaced from an element of the plurality of second elements by a distance less than or equal to 10% of a thickness of the blank, wherein the thickness of the blank is equal to a distance between the portion of the upper outer surface and the portion of the lower outer surface.

Thus, spacing between the dies used for cutting are smaller than normal, and this has been advantageously been found to form teeth having the correctly sized edge portions, that can then be bent back to form cutting edges of those teeth. the smaller spacing means that the resulting edge portions 'stick out', meaning that the width from edge portion to edge portion is larger than the width of the main body of the teeth.

In an example, each element of the plurality of first elements comprises a curved upper surface.

In an example, each element of the plurality of first elements has a chamfer.

In an example, the bending device comprises a second plate comprising a plurality of recesses, where a depth of each recess is less than a thickness of the blank, wherein the thickness of the blank is equal to a distance between the portion of the upper outer surface and the portion of the lower outer surface; and wherein in step f) bending of the edge portions of the teeth of the cutting blade or guard comprises locating the teeth within the plurality of recesses and moving the first plate and second plate toward each other.

In this way, the edges of the teeth can be bent back, substantially into the bottom plane of the teeth, in a simple process of pushing the two plates together within which is sandwiched the teeth of the cutting blade or guard.

In an example, openings of the plurality of recesses are located in a lower surface of the second plate, wherein a width of each opening at the lower surface is wider than a width of each cutting tooth, and wherein in step f) the lower surface of the second plate faces the upper surface of the first plate.

In this manner, the edge portions in being bent back "upwards" can have edge extents from one side of a cutting tooth to the opposite side that is wider than the main body of the cutting tooth.

The teeth need not have a width at the position of the cutting edges, formed from the bent edge portions, wider than other parts of the tooth.

In an example, each bottom of the plurality of recesses has flat portion with a width less than a width of each cutting tooth and has rounded corners on either sides of the recess extending from the plat portion to side portions on either side of the recess that are spaced apart from each other a distance greater than a width of each cutting tooth.

This provides for additional force being applied to the edges of the teeth, where the edge portions are required to be bent back, thereby provided for improved bending and material can be bent further back, such that the bottom surface of this material is moved towards being in the bottom plane of the teeth of the cutting blade or guard.

In a third aspect, there is provided a cutting and bending system for the forming of a plurality of teeth of a cutting blade or guard, the cutting and bending system comprising:

a cutting device; and
a bending device.

The cutting device comprises a first die and a second die. The first die comprises a plurality of first elements and the second die comprises a plurality of second elements. A first plane is defined with respect to upper surfaces of the plurality of first elements and a second plane is defined with respect to lower surfaces of the plurality of second elements. Each upper surface of the plurality of first elements has a centre part that lies in the first plane and edge parts that are below the first plane. The cutting device is configured to enable a blank of material to be placed in the cutting device. The blank comprises an upper outer surface and a lower outer surface. At least a portion of the lower outer surface is substantially planar and forms a plane of the blank. When the blank is placed in the cutting device, the portion of the lower outer surface faces the upper surfaces of the plurality of first elements and the portion of the upper outer surface faces the lower surfaces of the plurality of second elements. The first die and second die of the cutting device are configured to move with respect to each other such that the first plane is moved toward and passes through the second plane, such that each element of the plurality of first elements passes at least partially between adjacent elements of the plurality of second elements. When the blank is placed in the cutting device and cut by the cutting device, teeth of the cutting blade or guard are formed that correspond to the positions of the plurality of first elements. The teeth have a lower outer surface formed from the lower outer surface of the blank. When the blank has been cut by the cutting device edge portions of the teeth of the cutting blade or guard extend below the plane of the blank. The bending device is configured to bend the edge portions of the teeth of the cutting blade or guard that extend below the plane of the blank after cutting back toward the plane of the blank.

In an example, at least a portion of the upper outer surface is substantially planar.

In an example, the portion of the upper outer surface is substantially parallel to the portion of the lower outer surface.

In an example, the portion of the upper outer surface is angled to the portion of the lower outer surface.

In an example, the bending device comprises a first plate comprising a substantially planar upper surface. The bending device is configured to bend the edge portions of the teeth of the cutting blade or guard comprising the planar upper surface of the first plate being pushed against the lower outer surface of the teeth.

In an example, the first die and second die of the cutting device are configured such that when the each element of the plurality of first elements passes at least partially between adjacent elements of the plurality of second elements, an element of the plurality first elements is laterally spaced from an element of the plurality of second elements by a distance less than or equal to 10% of a thickness of the blank. The thickness of the blank is equal to a distance between the portion of the upper outer surface and the portion of the lower outer surface.

In an example, each element of the plurality of first elements has a chamfer.

In an example, an outer edge of the chamfer is a distance below the first plane that is greater than 6% of the thickness of the blank. The thickness of the blank is equal to a distance between the portion of the upper outer surface and the portion of the lower outer surface.

In an example, the bending device comprises a second plate comprising a plurality of recesses. A depth of each recess is less than a thickness of the blank. The thickness of the blank is equal to a distance between the portion of the upper outer surface and the portion of the lower outer surface. The second plate is configured such that teeth of the cutting blade or guard can be located within the plurality of recesses, wherein each tooth is located in a separate recess. The bending device is configured to bend the edge portions of the teeth of the cutting blade or guard comprising movement of the first plate and second plate toward each other.

In an example, openings of the plurality of recesses are located in a lower surface of the second plate. A width of each opening at the lower surface is wider than a width of each cutting tooth. The lower surface of the second plate faces the upper surface of the first plate.

In an example, each bottom of the plurality of recesses has flat portion with a width less than a width of each cutting tooth and has rounded corners on either sides of the recess extending from the flat portion to side portions on either side of the recess that are spaced apart from each other a distance greater than the width of each cutting tooth.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF THE EMBODIMENTS

Figure 1:
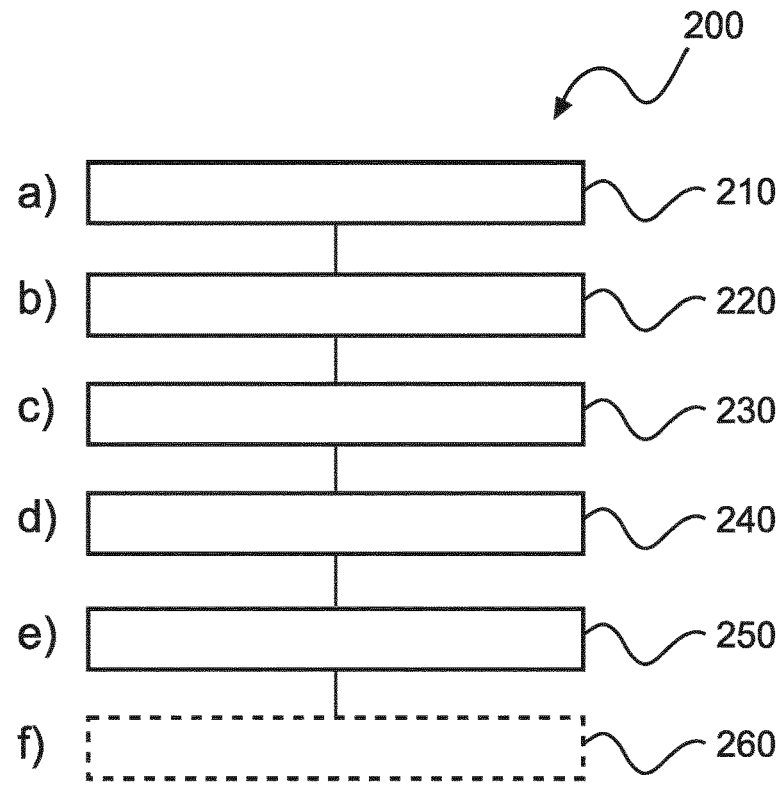
FIG. 1 shows a method of forming a plurality of teeth of a cutting blade or guard.

FIG. 1 shows a method 200 of forming a plurality of teeth of a cutting blade or guard in its basic steps, where essential steps are shown in solid lines. The method 200 comprises:

in a taking step 210, also referred to as step a), taking a blank of material, the blank having an upper outer surface and a lower outer surface, wherein at least a portion of the lower outer surface is substantially planar and forms a plane of the blank;

in a utilizing step 220, also referred to as step b), utilizing a cutting device 20 comprising a first die 40 and a second die (50, wherein the first die comprises a plurality of first elements 42 and the second die comprises a plurality of second elements 52, wherein a first plane 60 is defined with respect to upper surfaces of the plurality of first elements and a second plane 70 is defined with respect to lower surfaces of the plurality of second elements, and wherein each upper surface of the plurality of first elements has a centre part 44 that lies in the first plane and edge parts 46 that are below the first plane;

in a placing step 230, also referred to as step c), placing the blank in the cutting device, such that the portion of the lower outer surface faces the upper surfaces of the plurality of first elements and the portion of the upper outer surface faces the lower surfaces of the plurality of second elements;

in a moving step 240, also referred to as step d), moving the first die and second die with respect to each other such that the first plane is moved toward and passes through the second plane, such that each element of the plurality of first elements passes at least partially between adjacent elements of the plurality of second elements, and wherein teeth 80 of the cutting blade or guard are formed that correspond to the positions of the plurality of first elements and wherein the teeth have a lower outer surface formed from the lower outer surface of the blank;

in a utilizing step 250, also referred to as step e), utilizing a bending device 30 to bend edge portions 82 of the teeth of the cutting blade or guard that extend below the plane of the blank after step d) back toward the plane of the blank.

In an example, at least a portion of the upper outer surface is substantially planar.

In an example, the portion of the upper outer surface is substantially parallel to the portion of the lower outer surface.

In an example, the portion of the upper outer surface is angled to the portion of the lower outer surface.

Thus, a portion of the blank can be generally flat and planar such that teeth have a constant thickness along their length toward the ends. However, a portion of the blank can have a generally flat bottom surface and a generally flat upper surface that is angled to the bottom, and thus have a varying thickness, such that the teeth change their thickness along their length. However, the overall blank can be curved but where over a portion of the blank, such as covering a lateral area where two or more teeth will be formed, is as described above. Thus, overall the blank could be curved or pre-bended, for example for a rota-shaver cutter/guard. What is important is that in cutting the blank the teeth are cut such that they have edges on the bottom surface that protrude below that surface in the direction that the second die 50 was moving. Thus, for a flat blank or a curved blank, this still applies as described above.

It should also be noted that the above described method provides a process to form teeth of a cutting blade or guard, and as such there can be other process steps required to form a finished cutting blade or guard with steps that are before and/or after those described above.

It is to be noted that the above described method need not form all the teeth of a cutting blade or guard in one implementation. For example, the method could be applied a first time to cut a first plurality of teeth and applied a second time to cut a second plurality of teeth etc. Also, the method could be applied a first time and further times using the same first and second dies. However, the method can be applied multiple times with different first and second dies to cut all the teeth of a cutting blade or guard, but utilizing the same method steps as defined above with dies that conform to the above described functional features. Thus, for example multiple teeth in a trimmer guard can be cut out using multiple cutters, but also using only one cutter (pair of dies), depending on the outer contour that is required to be cut out. In other words, the method steps a-d can be applied once or a number of times to cut different sets of teeth of an overall cutter/guard and step e) applied can be applied once, or steps a-e can be applied once or a number of times to cut different sets of teeth of an overall cutter/guard. Thus, in effect the first and second dies described above can be considered to be each single elements, or made up of a number of elements. Thus, the first and second dies can be one pair of elements to cut teeth, or a number of sets of elements to cut teeth.

In an example, step e) comprises using a rolling process to bend the edge portions of the teeth of the cutting blade or guard.

According to an example, in step e) the bending device comprises a first plate 90 comprising a substantially planar upper surface 92. The method then comprises step f) bending 260 the edge portions of the teeth of the cutting blade or guard by pushing the planar upper surface of the first plate against the lower outer surface of the teeth.

In an example, a second plate interacts with the upper outer surface of the teeth whilst the first plate pushed against the lower outer surface of the teeth.

According to an example, the first die and second die of the cutting device are configured such that in step d) when the each element of the plurality of first elements passes at least partially between adjacent elements of the plurality of second elements, an element of the plurality first elements is laterally spaced from an element of the plurality of second elements by a distance 100 less than or equal to 15% of a thickness 110 of the blank. The thickness of the blank is equal to a distance between the portion of the upper outer surface and the portion of the lower outer surface.

In an example, when the each element of the plurality of first elements passes at least partially between adjacent elements of the plurality of second elements, an element of the plurality first elements is laterally spaced from an element of the plurality of second elements by a distance 100 less than or equal to 13% of a thickness 110 of the blank, In a particularly preferable example, when the each element of the plurality of first elements passes at least partially between adjacent elements of the plurality of second elements, an element of the plurality first elements is laterally spaced from an element of the plurality of second elements by a distance 100 less than or equal to 10% of a thickness 110 of the blank, In an example, when the each element of the plurality of first elements passes at least partially between adjacent elements of the plurality of second elements, an element of the plurality first elements is laterally spaced from an element of the plurality of second elements by a distance 100 less than or equal to 8% of a thickness 110 of the blank, In an example, when the each element of the plurality of first elements passes at least partially between adjacent elements of the plurality of second elements, an element of the plurality first elements is laterally spaced from an element of the plurality of second elements by a distance 100 less than or equal to 6% of a thickness 110 of the blank.

According to an example, each element of the plurality of first elements comprises a curved upper surface 47.

According to an example, each element of the plurality of first elements has a chamfer 48.

In an example, an outer edge of the chamfer is a distance 120 below the first plane greater than 6% of the thickness of the blank.

According to an example, the bending device comprises a second plate 130 comprising a plurality of recesses 140. A depth 150 of each recess is less than a thickness of the blank, where the thickness of the blank is equal to a distance between the portion of the upper outer surface and the portion of the lower outer surface. In step f) bending of the edge portions of the teeth of the cutting blade or guard comprises locating the teeth within the plurality of recesses and moving the first plate and second plate toward each other.

According to an example, openings of the plurality of recesses are located in a lower surface 160 of the second plate. A width 170 of each opening at the lower surface is wider than a width of each cutting tooth. In step f) the lower surface of the second plate faces the upper surface of the first plate.

According to an example, each bottom of the plurality of recesses has flat portion with a width less than a width of each cutting tooth and has rounded corners on either sides of the recess extending from the plat portion to side portions on either side of the recess that are spaced apart from each other a distance greater than a width of each cutting tooth.

Thus, a cutting blade or guard can be manufactured with teeth formed from a blank of material according to the method described with respect to FIG. 1.

From the above described method, and from FIGS. 2-10, an example relates to a cutting and bending system for the forming of plurality of teeth of a cutting blade or guard. The cutting and bending system comprises a cutting device 20, and a bending device 30. The cutting device comprises a first die 40 and a second die 50. The first die comprises a plurality of first elements 42 and the second die comprises a plurality of second elements 52. A first plane 60 is defined with respect to upper surfaces of the plurality of first elements and a second plane 70 is defined with respect to lower surfaces of the plurality of second elements. Each upper surface of the plurality of first elements has a centre part 44 that lies in the first plane and edge parts 46 that are below the first plane. The cutting device is configured to enable a blank of material to be placed in the cutting device. The blank comprises an upper outer surface and a lower outer surface. At least a portion of the lower outer surface is substantially planar and forms a plane of the blank. When the blank is placed in the cutting device, the portion of the lower outer surface faces the upper surfaces of the plurality of first elements and the portion of the upper outer surface faces the lower surfaces of the plurality of second elements. The first die and second die of the cutting device are configured to move with respect to each other such that the first plane is moved toward and passes through the second plane. In this manner each element of the plurality of first elements passes at least partially between adjacent elements of the plurality of second elements. When the blank is placed in the cutting device and cut by the cutting device, teeth 80 of the cutting blade or guard are formed, that correspond to the positions of the plurality of first elements. The teeth have a lower outer surface formed from the lower outer surface of the blank. The cutting device is configured such that when the blank has been cut by the cutting device, edge portions 82 of the teeth of the cutting blade or guard extend below the plane of the blank. The bending device is configured to bend the edge portions of the teeth of the cutting blade or guard that extend below the plane of the blank after cutting back toward the plane of the blank.

In an example, at least a portion of the upper outer surface is substantially planar.

In an example, the portion of the upper outer surface is substantially parallel to the portion of the lower outer surface.

In an example, the portion of the upper outer surface is angled to the portion of the lower outer surface.

According to an example, the bending device comprises a first plate 90 comprising a substantially planar upper surface 92. The bending device is configured to bend the edge portions of the teeth of the cutting blade or guard. The device carries out this bending through the planar upper surface of the first plate being pushed against the lower outer surface of the teeth.

According to an example, the first die and second die of the cutting device are configured such that when the each element of the plurality of first elements passes at least partially between adjacent elements of the plurality of second elements, an element of the plurality first elements is laterally spaced from an element of the plurality of second elements by a distance 100 less than or equal to 10% of a thickness 110 of the blank. The thickness of the blank is equal to a distance between the portion of the upper outer surface and the portion of the lower outer surface.

In an example, when the each element of the plurality of first elements passes at least partially between adjacent elements of the plurality of second elements, an element of the plurality first elements is laterally spaced from an element of the plurality of second elements by a distance 100 less than or equal to 8% of a thickness 110 of the blank.

In an example, when the each element of the plurality of first elements passes at least partially between adjacent elements of the plurality of second elements, an element of the plurality first elements is laterally spaced from an element of the plurality of second elements by a distance 100 less than or equal to 6% of a thickness 110 of the blank.

In an example, each element of the plurality of first elements comprises a curved upper surface 47.

According to an example, each element of the plurality of first elements has a chamfer 48.

In an example, the chamfer has an angle of approximately 45 degrees.

In an example, the chamfer has an angle of approximately 40 degrees.

In an example, the chamfer has an angle of approximately 30 degrees.

In an example, the chamfer has an angle of approximately 25 degrees.

In an example, the chamfer has an angle of approximately 20 degrees.

According to an example, an outer edge of the chamfer is a distance 120 below the first plane that is greater than 6% of the thickness of the blank, wherein the thickness of the blank is equal to a distance between the portion of the upper outer surface and the portion of the lower outer surface.

According to an example, the bending device comprises a second plate 130 comprising a plurality of recesses 140. A depth 150 of each recess is less than a thickness of the blank, where the thickness of the blank is equal to a distance between the portion of the upper outer surface and the portion of the lower outer surface. The second plate is configured such that teeth of the cutting blade or guard can be located within the plurality of recesses. Each tooth can be located in a separate recess. The bending device is configured to bend the edge portions of the teeth of the cutting blade or guard comprising movement of the first plate and second plate toward each other.

According to an example, openings of the plurality of recesses are located in a lower surface 160 of the second plate. A width 170 of each opening at the lower surface is wider than a width 84 of each cutting tooth. The lower surface of the second plate faces the upper surface of the first plate.

According to an example, each bottom of the plurality of recesses has flat portion with a width 180 less than a width 84 of each cutting tooth and has rounded corners 190 on either sides of the recess extending from the flat portion to side portions on either side of the recess that are spaced apart from each other a distance 170 greater than the width of each cutting tooth.

Thus, the method of forming a plurality of teeth of a cutting blade or guard, the cutting blade or guard having a plurality of teeth formed by the method, and the cutting and bending system for the forming of a plurality of teeth of a cutting blade or guard as described above has advantages. Conventional stamping leads to cutting edge angle larger than 90°, whilst forging leads to a blunt cutting edge due to the work hardening of steel, and etching is complex and expensive. The new teeth forming method described here leads to a cutting edge angle lower than 90° and a sharp cutting edge tip (radius of tip can be smaller than 2 μm). At the same time, the manufacturing techniques are not expensive because only metal forming techniques are required and finishing techniques are not required.

The new method, where an edge of material is created in a first cutting step by using for example a chamfered die plate that is then pushed back (by force) in a second coining/bending step, has applicability for all kinds of linear cutting elements, such as utilised in shavers and trimmers, and also finds utility for rotary cutting systems. Thus the new two-step cold forming process, or method, enables guard and cutting-edge teeth to be manufactured with a sharp edge, in a cost-effective manner.

The method of forming a plurality of teeth of a cutting blade or guard, the cutting blade or guard having a plurality of teeth formed by the method, and the cutting and bending system for the forming of a plurality of teeth of a cutting blade or guard are now described in more with respect to detailed specific examples, where reference is made to FIGS. 2-10.

Figure 2:
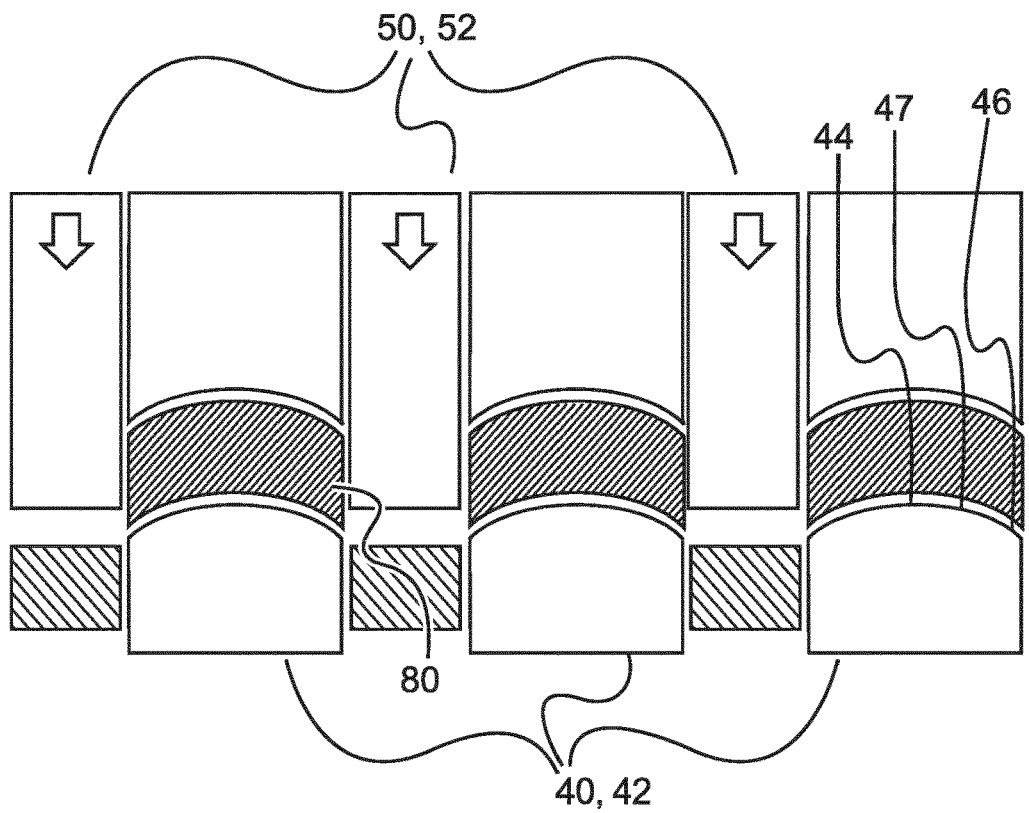
FIG. 2 shows a schematic example of a plurality of teeth of a cutting blade or guard being cut.
Figure 3:
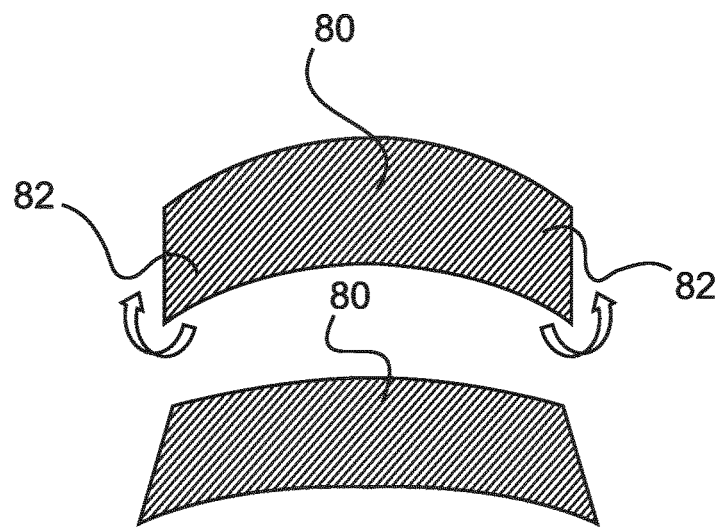
FIG. 3 shows a schematic example of a tooth of a cutting blade or guard being bent.

FIG. 2 shows on the left a blank of material, such as steel, being cut to form teeth or lamellae 80, in order to form excesses of material or edge portions 82 at the edges of the cut. A first die (or cutting plate) 40 has a number of cutting elements 42 and a second die (or punch) 50 has a number of cutting elements 52. The central part 44 of the cutting elements 42 of the first die 40 is higher or raised above the edges, and in this example the cutting elements 42 have a curved surface 47. In this way, as the blank is cut to form the teeth 80, each tooth has edge portions 82 that protrude downwards, as shown at the top of FIG. 3. The teeth or lamellae of are shown over the cutting plate or elements of the first die, whilst scrap material has been cut and is shown below the punch elements of the second die. In order to help facilitate this, the second die can have a blank holder as shown in FIG. 2, that comes down onto the teeth. However, the cutting process with the cutting elements of the first and second die to create the teeth 80 having the correct form does not require the blank holder. What is necessary is that the cutting elements 42 of the first die 40 have edges 46 that are below the centre of each cutting element 42. Returning to FIG. 3 the top image shows schematically a tooth 80 that has just been cut as shown in FIG. 2, and in the bottom image of FIG. 3 that tooth 80 is shown after the edge portions 82 have been bent upwards. It is to be noted that shown here is a cutting step of the forming process, and the teeth are yet to be bent, as discussed in detail below.

Figure 4:
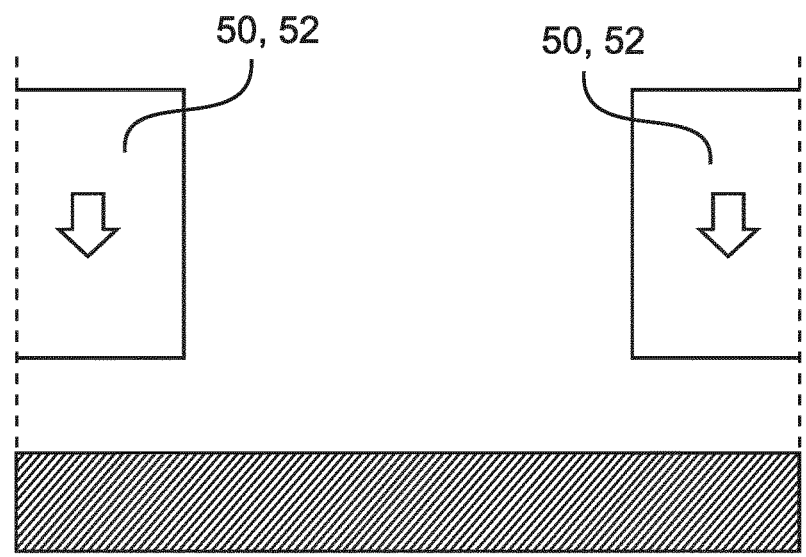
FIG. 4 shows a schematic example of a tooth of a cutting blade or guard about to be cut.
Figure 4:
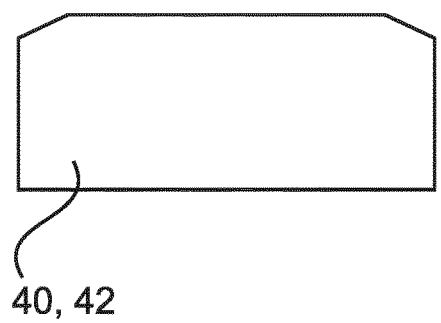
Figure 5:
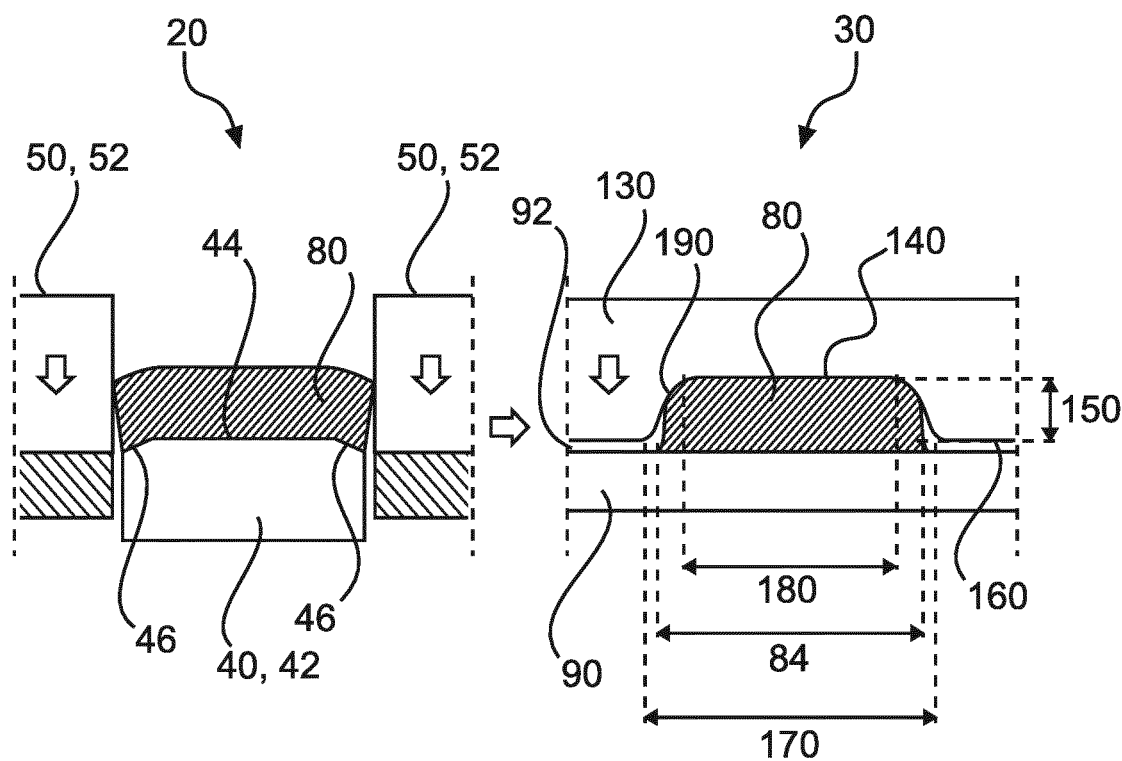
FIG. 5 on the left represents a forming step following on from FIG. 4, showing a schematic example of a tooth of a cutting blade or guard being cut, and on the right represents a forming step following on from the cutting step showing a schematic example of the tooth of a cutting blade or guard being bent.
Figure 6:
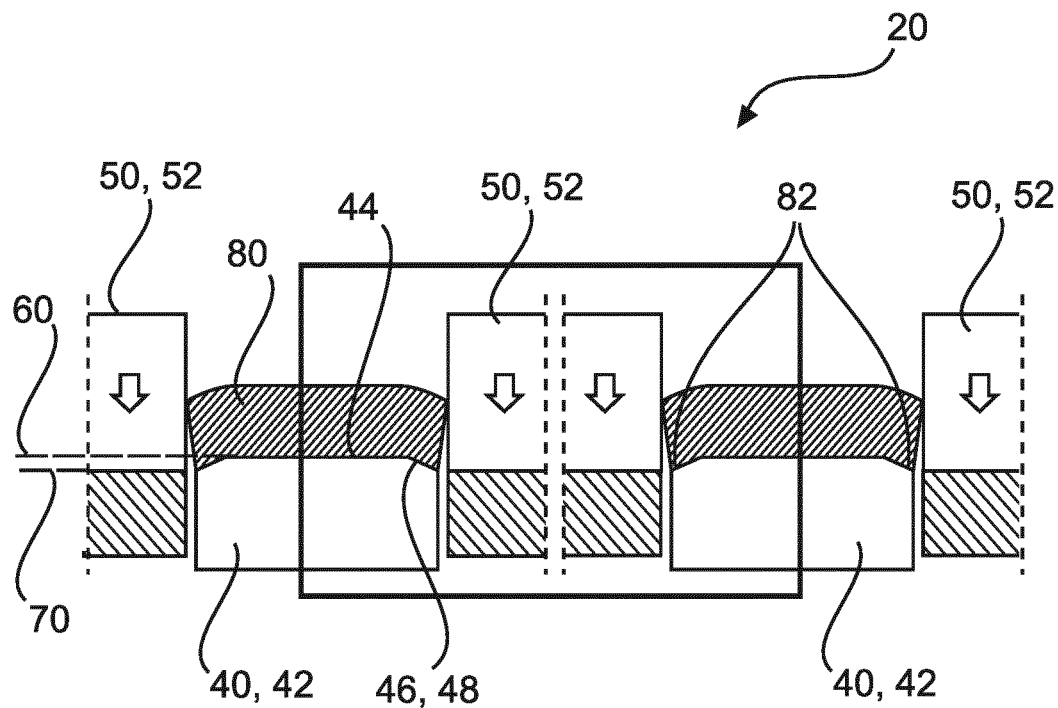
FIG. 6 shows a schematic example of a plurality of teeth of a cutting blade or guard being cut.
Figure 7:
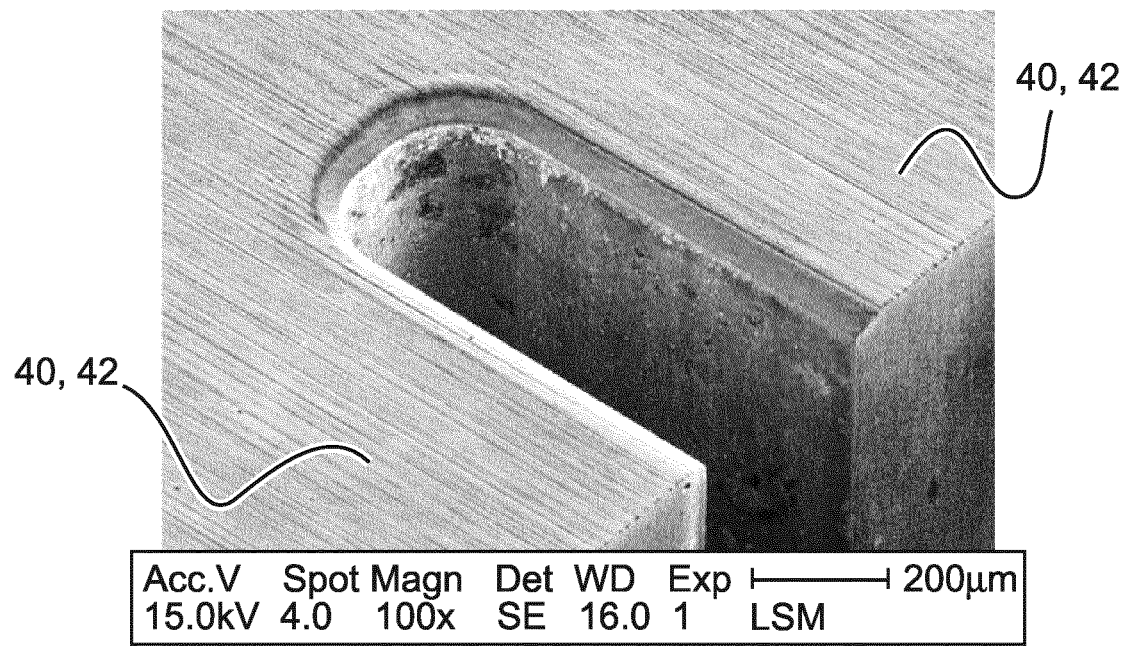
FIG. 7 shows an example of the bottom cutting die as shown schematically in FIG. 6 as the region within the box shown in FIG. 6 but without the top cutting die being present.

FIGS. 4-5 show examples of a different detailed mechanism of cutting and bending a blank of material to form teeth 80 of the cutting blade or guard. The cutting process utilizing a cutting device 20 is followed by the bending process utilizing a bending device 30 to form the plurality of teeth 80. In FIG. 4, a blank of material is positioned over cutting element 42 of the first die 40, and two cutting elements 52 of the second die 50 are shown. The cutting element 42 again has a centre 44 higher than the edges 46, that in this example is chamfered 48. A first plane 60 is formed with respect to the centres 44 of the cutting elements 42 of the first die 40. A second plane 70 is formed with respect to the lower surfaces of the cutting elements 52 of the second die 50. As shown in the left hand image of FIG. 5 the blank is cut through the first die moving towards the second die, or the second die moving towards the first die, or the first die and second die moving towards each other such that the first plane 60 and second plane 70 cross one another, as shown in FIG. 6. In this way teeth 80 of the cutting blade or guard are cut, which have edge portions 82 that extend below the bottom surface of the teeth. As shown in the left hand image of FIG. 5 the waste portions of the blank are shown below the cutting elements 52 of the second die 50, having been "cut off". Then as shown in the right hand image of FIG. 5 the teeth 80 that have been cut are then bent to form teeth of a cutting blade or guard of a shaver or trimmer. The teeth 80 are positioned within recesses 140 of a plate 130. The recesses have a depth 150 that is less than the thickness of the blank. The bottom of the recesses has rounded corners 190 and the width 180 of the bottom of the recess is less than a width of the tooth. However, the opening of the recess has a width 170 that is wider than the width 84 of the tooth at its lower surface. Then a plate 90 has its upper surface 92 pushed up against the teeth 80 and the edge portions 82 that protrude downwards are bent upwards and form sharp and robust cutting edges. This configuration aids in bending the edge portion 82 upwards, but the top plate could just be a flat plate, like the bottom plate, and need not have recesses.

FIG. 6 again shows a blank being cut by the first and second dies as discussed above, and FIG. 7 shows an image of part of the first die 40 showing cutting elements 42. In FIG. 6 a rectangle is shown bisecting the first die 40 and its cutting elements 42, and in effect this is what is being shown in the image of FIG. 7, where the hole shown is where an element 52 of the second die 50 will move during the cutting process. Thus, in the image of FIG. 7 parts of the top surfaces of two elements 42 of the first die 40 are shown and the second die 50 is not shown, but an element 52 of the second die will move downwards and pass within the gap (or hole) shown.

The dies 40, 50 can be made using techniques known as such.

Figure 8:
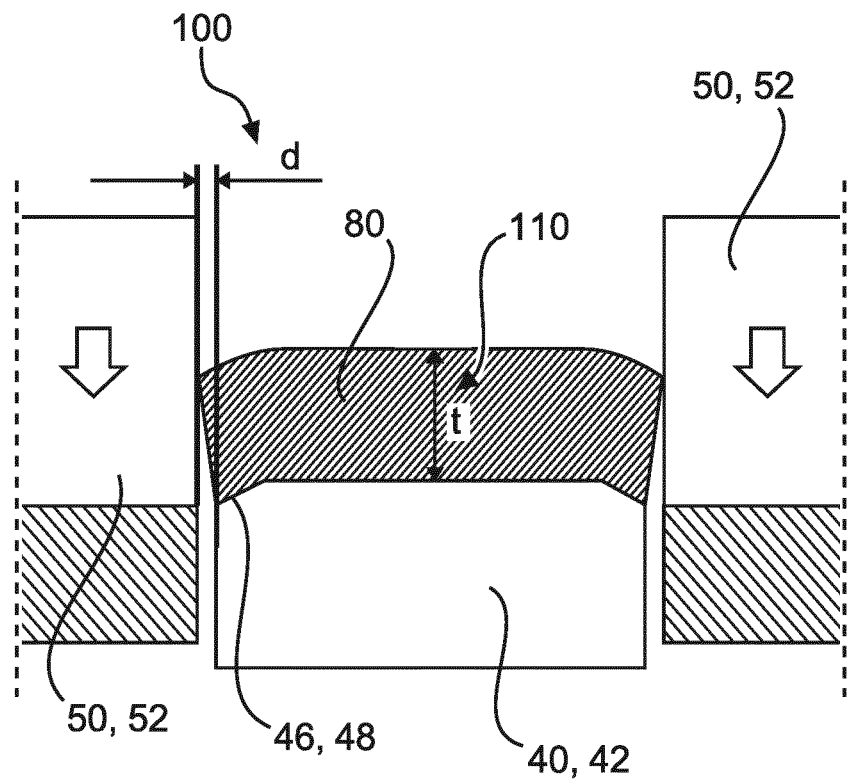
FIG. 8 shows a schematic example of a tooth of a cutting blade or guard being cut.

FIG. 8 shows further detail of the first die 40 and its cutting elements 42 and the second die 50 and its cutting elements 52. The clearance (d) 100 is provided between the cutting elements as they pass past one another, that is in this detailed example 6% or lower than the thickness (t) 110 of the blank. The clearance can be larger than this, for example of the order of 10% or lower than the thickness of the blank. As shown in FIGS. 5, 6 and 8 in cutting the blank the top part of each tooth can be wider than the bottom part that has edges 82 that extend below the bottom surface of the tooth. In the bending process, where these edges are bent back towards the bottom plane or surface of the teeth, the final width of the bottom surface that now has sharp cutting edges can be wider than the top part of the tooth or can be narrower than the top part of the tooth due to the top part of the tooth having been splayed outwards during the cutting process. Indeed, the second die 50 can have chamfered edges of its cutting elements 52 in order to generate a tooth having the correct size profile through its thickness. This is shown in more detail in FIGS. 9 and 10 that show images of final teeth of cutting blades and guards.

Figure 9:
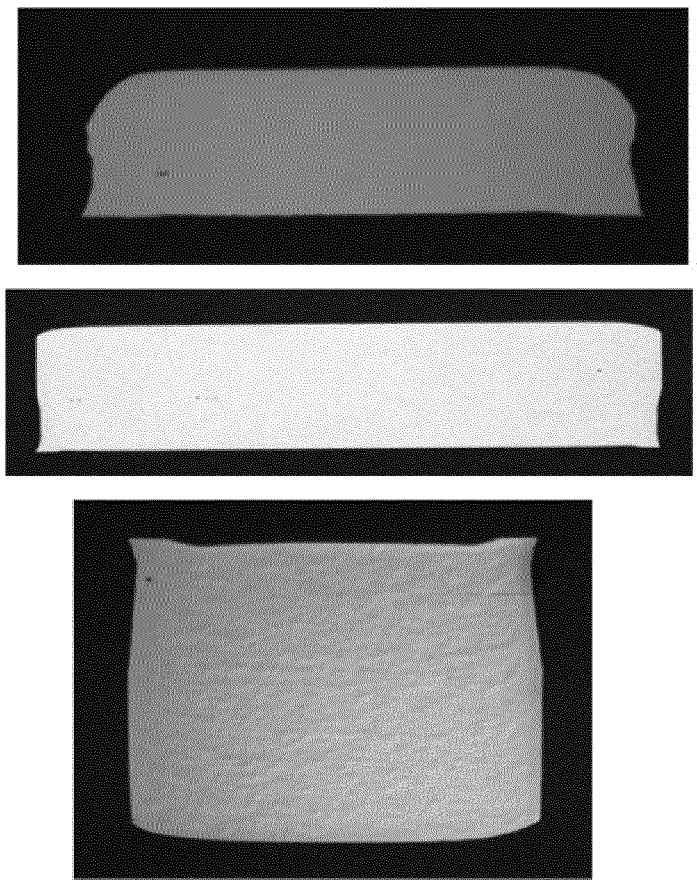
FIGS. 9 and 10 show examples of teeth of cutting blades or guards formed by the new method

FIG. 9 then shows on the top image a tooth formed by the cutting and bending process described here for a guard having a thickness of 0.11 mm and shows on the middle image a tooth formed by the cutting and bending process described here for a guard having a thickness of 0.3 mm. The bottom image shows a tooth formed by the cutting and bending process described here.

Figure 10:
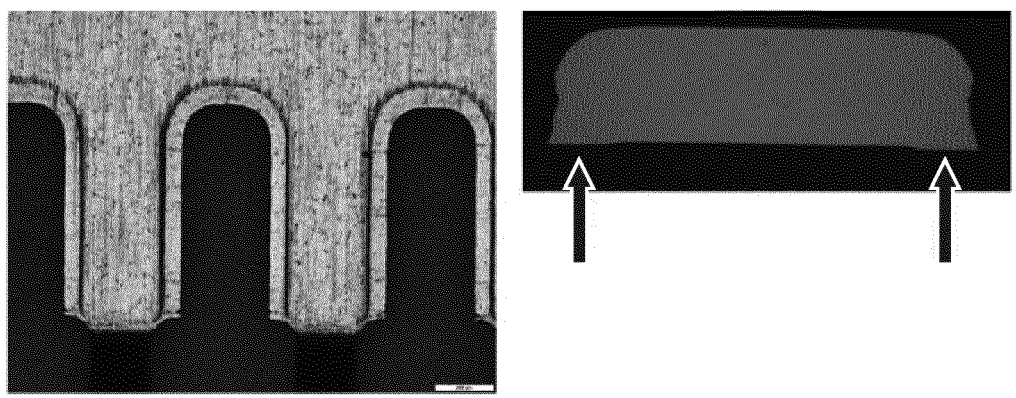

As shown in FIG. 10 the teeth have sharp edges, where edge portions that previously protruded downwards from a cutting step have then been bent back upwards during a bending step. However, the sharp edges are part of a global region (shown with the arrows) that is slightly below the overall bottom of the tooth, because this part of material is generally not bent fully back into the plane of the bottom of the tooth. This is clearly shown in the cross section through a tooth as shown in FIGS. 9-10 and in the plan image of FIG. 10, where the bent edge portions are clearly visible because they have not been bent exactly back into the bottom plane. Also as shown in FIGS. 9-10 the main body of a formed tooth can be wider that the cutting edges, or vice versa, depending upon deformation of the tooth during the cutting and/or bending process.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method of forming a plurality of teeth of a cutting blade or guard, the method comprising:
    a) providing a blank of material, the blank having an upper outer surface and a lower outer surface, wherein at least a portion of the lower outer surface is substantially planar and forms a plane of the blank;

b) providing a cutting device comprising a first die and a second die, wherein the first die comprises a plurality of first elements and the second die comprises a plurality of second elements, wherein a first plane is defined with respect to upper surfaces of the plurality of first elements and a second plane is defined with respect to lower surfaces of the plurality of second elements, and wherein each upper surface of the plurality of first elements has a center part that lies in the first plane and edge parts that are below the first plane;

c) placing the blank in the cutting device, such that a portion of the lower outer surface faces the upper surfaces of the plurality of first elements and a portion of the upper outer surface faces the lower surfaces of the plurality of second elements;

d) moving the first die and second die with respect to each other such that the first plane is moved toward and passes through the second plane, such that each element of the plurality of first elements passes at least partially between adjacent elements of the plurality of second elements, and wherein teeth of the cutting blade or guard are formed that correspond to positions of the plurality of first elements and wherein the teeth have a lower outer surface formed from the lower outer surface of the blank; and e) after step d), bending, utilizing a bending device, edge portions of the teeth of the cutting blade or guard that extend below the plane of the blank back toward the plane of the blank.

2. The method according to claim 1, wherein in step e) the bending device comprises a first plate comprising a substantially planar upper surface; and wherein the method further comprises step f) bending edge portions of the teeth of the cutting blade or guard by pushing the planar upper surface of the first plate against the lower outer surface of the teeth.

3. The method according to claim 1, wherein the first die and second die of the cutting device are configured such that in step d) when the each element of the plurality of first elements passes at least partially between adjacent elements of the plurality of second elements, an element of the plurality first elements is laterally spaced from an element of the plurality of second elements by a distance less than or equal to 15% of a thickness of the blank, optionally less than or equal to 10% of the thickness of the blank, wherein the thickness of the blank is equal to a distance between the portion of the upper outer surface and the portion of the lower outer surface.

4. The method according to claim 1, wherein each element of the plurality of first elements comprises a curved upper surface.

5. The method according to claim 1, wherein each element of the plurality of first elements has a chamfer, the chamfer being in a range of 20% to 45%, optionally in the range of 25% to 30%.

6. The method according to claim 2, wherein the bending device comprises a second plate comprising a plurality of recesses, where a depth of each recess is less than a thickness of the blank, wherein the thickness of the blank is equal to a distance between the portion of the upper outer surface and the portion of the lower outer surface; and wherein in step f) bending of the edge portions of the teeth of the cutting blade or guard comprises locating the teeth within the plurality of recesses and moving the first plate and second plate toward each other.

7. The method according to claim 6, wherein openings of the plurality of recesses are located in a lower surface of the second plate, wherein a width of each opening at the lower surface is wider than a width of each cutting tooth, and wherein in step f) the lower surface of the second plate faces the upper surface of the first plate.

8. The method according to claim 6, wherein each bottom of the plurality of recesses has flat portion with a width less than a width of each cutting tooth and has rounded corners on either side of the recess extending from the plat portion to side portions on either side of the recess that are spaced apart from each other a distance greater than a width of each cutting tooth.

9. A cutting and bending system for the forming of plurality of teeth of a cutting blade or guard, the cutting and bending system comprising:
 a cutting device; and
 a bending device;
 wherein, the cutting device comprises a first die and a second die, wherein the first die comprises a plurality of first elements and the second die comprises a plurality of second elements, wherein a first plane is defined with respect to upper surfaces of the plurality of first elements and a second plane is defined with respect to lower surfaces of the plurality of second elements, and wherein each upper surface of the plurality of first elements has a center part that lies in the first plane and edge parts that are below the first plane;
 wherein the cutting device is configured to enable a blank of material to be placed in the cutting device, wherein the blank comprises an upper outer surface and a lower outer surface, wherein at least a portion of the lower outer surface is substantially planar and forms a plane of the blank; and wherein when the blank is configured to be placed in the cutting device with a portion of the lower outer surface facing the upper surfaces of the plurality of first elements and a portion of the upper outer surface facing the lower surfaces of the plurality of second elements;
 wherein the first die and second die of the cutting device are configured to move with respect to each other such that the first plane is moved toward and passes through the second plane, such that each element of the plurality of first elements passes at least partially between adjacent elements of the plurality of second elements, and wherein when the blank is placed in the cutting device and cut by the cutting device, teeth of the cutting blade or guard are formed that correspond to positions of the plurality of first elements, and wherein the teeth have a lower outer surface formed from the lower outer surface of the blank;
 wherein when the blank has been cut by the cutting device, edge portions of the teeth of the cutting blade or guard extend below the plane of the blank; and
 wherein the bending device is configured to bend the edge portions of the teeth of the cutting blade or guard that extend below the plane of the blank after cutting back toward the plane of the blank.

10. The cutting and bending system according to claim 9, wherein the bending device comprises a first plate comprising a substantially planar upper surface, and wherein the bending device is configured to bend the edge portions of the teeth of the cutting blade or guard comprising the planar upper surface of the first plate being pushed against the lower outer surface of the teeth.

11. The cutting and bending system according to claim 9, wherein the first die and second die of the cutting device are configured such that when the each element of the plurality of first elements passes at least partially between adjacent elements of the plurality of second elements, an element of the plurality first elements is laterally spaced from an element of the plurality of second elements by a distance less than or equal to 10% of a thickness of the blank, wherein the thickness of the blank is equal to a distance between the portion of the upper outer surface and the portion of the lower outer surface.

12. The cutting and bending system according to claim 9, wherein each element of the plurality of first elements has a chamfer, the chamfer being in a range of 20% to 45%, optionally in the range of 25% to 30%.

13. The cutting and bending system according to claim 12, wherein an outer edge of the chamfer is a distance below the first plane that is greater than 6% of the thickness of the blank, wherein the thickness of the blank is equal to a distance between the portion of the upper outer surface and the portion of the lower outer surface.

14. The cutting and bending system according to claim 9, wherein the bending device comprises a second plate comprising a plurality of recesses, where a depth of each recess is less than a thickness of the blank, wherein the thickness of the blank is equal to a distance between the portion of the upper outer surface and the portion of the lower outer surface; and wherein the second plate is configured such that the teeth of the cutting blade or guard can be located within the plurality of recesses, wherein each tooth is located in a separate recess, and wherein the bending device is configured to bend the edge portions of the teeth of the cutting blade or guard by moving the first plate and second plate toward each other.

* * * * *